United States Patent [19]

Anderson

[11] Patent Number: 4,867,420
[45] Date of Patent: Sep. 19, 1989

[54] FENCE

[76] Inventor: Arthur Anderson, 4326 W. 38th St., Anderson, Ind. 46011

[21] Appl. No.: 272,352

[22] Filed: Nov. 17, 1988

[51] Int. Cl.⁴ .................................... E04H 17/00
[52] U.S. Cl. ............................. 256/1; 256/DIG. 4; 403/403; 403/205
[58] Field of Search ............ 403/205, 403, 402, 232.1; 256/DIG. 4, 19, 1

[56] References Cited

U.S. PATENT DOCUMENTS

| | | | |
|---|---|---|---|
| 4,318,628 | 3/1982 | Maneini | 403/232.1 X |
| 4,508,319 | 4/1985 | Tappan et al. | 256/19 |
| 4,753,376 | 6/1988 | Tulio | 403/205 X |

Primary Examiner—Andrew V. Kundrat
Attorney, Agent, or Firm—John H. Calhoun, Jr.

[57] ABSTRACT

A fence comprising a fence board support bracket having a base and having provided on the said base guide means adapted to receive removably inserted therein one or more fence boards, means for anchoring said base to the ground, and one or more fence boards adapted to be removably inserted into the said guide means, wherein the said base comprises a flat plate having provided therethrough a plurality of holes each of which is adapted to receive a stake removably inserted therethrough, and and wherein the said guide means comprises a channel formed by a pair of opposing side members, and wherein the said anchor means comprises a plurality of stakes each of which is adapted to be removably inserted through a hole of said plurality of holes in the said base and to be driven into the ground.

1 Claim, 2 Drawing Sheets

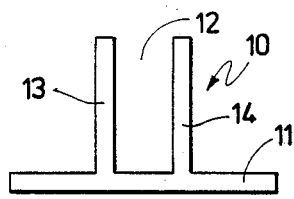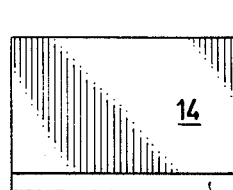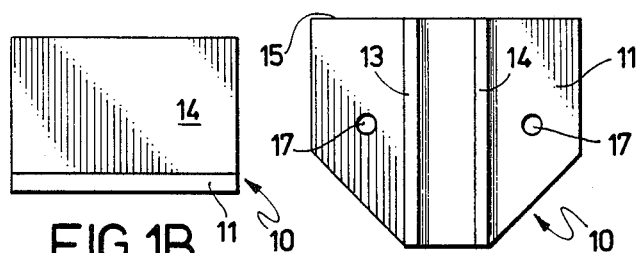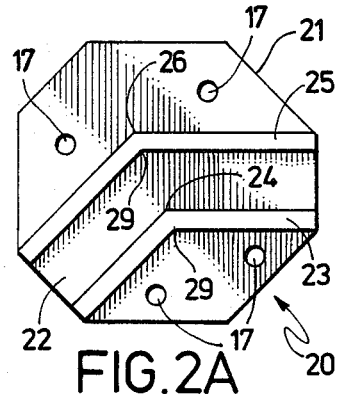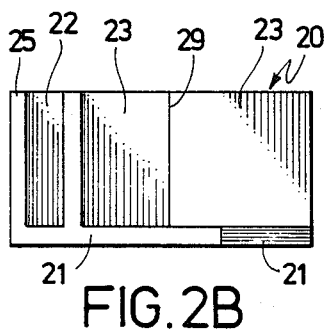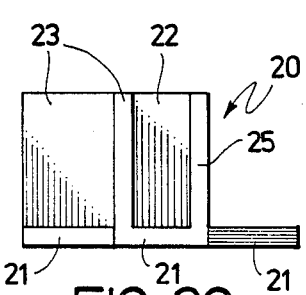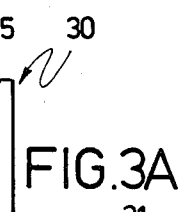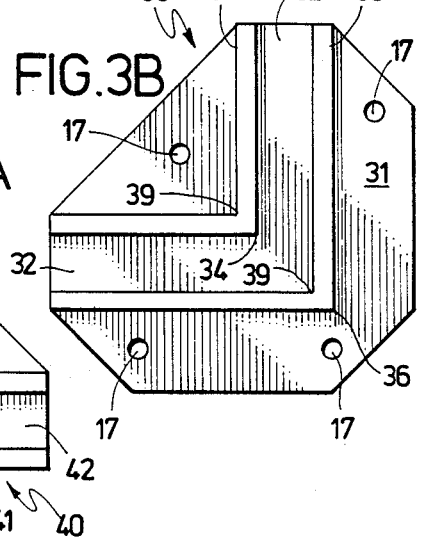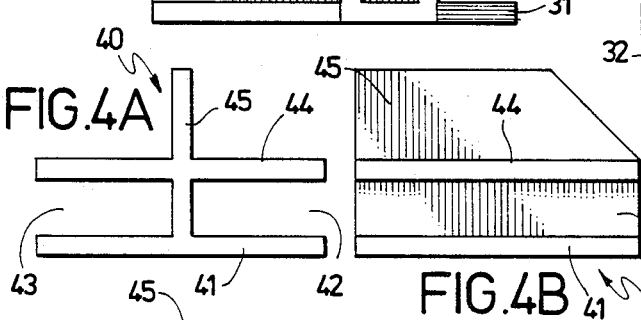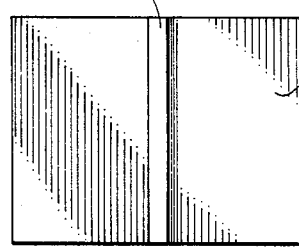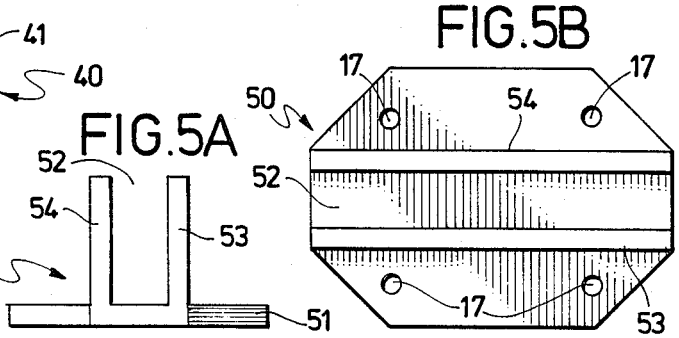

FENCE

BACKGROUND OF THE INVENTION

The present invention relates to an improved boundary fence or retaining wall.

Fences are known in the prior art as illustrated by U.S. Pat. No. 245,234 issued to Frank L. Smith and Benjamin A. Wells on Aug. 2, 1881 which shows a means for constructing a post and a means for securing panels thereto. U.S. Pat. No. 2,718,382 which issued on Sept. 20, 1955 to G. M. Bird shows a recess slot masonry fence post. U.S. Pat. No. 197,054 which issued on Nov. 13, 1877 to Richard J. Redmond shows a cast iron fence post, and U.S. Pat. No. 3,989,226 which issued on Nov. 2, 1976 to Allen L. Burgess shows a post-mounted fence board support bracket assembly comprising a pair of opposed channel plates supporting a fence board clamped therebetween, and having a bearing sleeve portion extending from one of the plates through a bore in the fence post in which the brackets are mounted and fastening means for fastening the bracket assembly to the post.

The present invention provides a novel and useful fence assembly that is uniquely suited for use around borders, such as driveways and flower beds.

SUMMARY OF THE INVENTION

The fence of the present invention provides several important and distinct advantages not found in fences previously known in the art.

A primary objective of the present invention is to provide a fence that may be assembled and disassembled quickly and easily. Another objective of the present invention is to provide a fence that can be easily varied in length, height and course.

Another object of the present invention is to provide a fence that may be quickly and reliably anchored to and detached from the ground.

Another object of the present invention is to provide a fence that is simple in construction, inexpensive, strong and durable, and well adapted for the purposes for which it is designed.

Other objects and advantages of the present invention will become apparent from a consideration of the following detailed description taken in connection with the accompanying drawings wherein a preferred embodiment of the invention is shown.

It should be understood that the invention is not limited to the details disclosed, but includes all such variations and modifications as fall within the spirit of the invention and the scope of the appended claims.

This invention contemplates the use of fence support brackets of different sizes.

The objectives of the present invention are accomplished by providing a plurality of end brackets, angle brackets, corner brackets, stacking brackets, and splice brackets adapted to be anchored to the ground and adapted to receive removably inserted therein a plurality of fence boards, a plurality of fastening means adapted to anchor the said brackets to the ground, and a plurality of fence boards adapted to be removably inserted into the said brackets.

BRIEF DESCRIPTION OF THE DRAWINGS

A preferred embodiment of the present invention is illustrated in the accompanying drawings in which:

FIG. 1A is a side elevation view of an end bracket of the present invention;

FIG. 1B is a front elevation view of the said end bracket;

FIG. 1C is a top plan view of the said end bracket;

FIG. 2A is a top plan view of an angle bracket of the present invention;

FIG. 2B is a front elevation view of the said angle bracket;

FIG. 2C is a front elevation view of the said angle bracket;

FIG. 3A is a front elevation view of a corner bracket of the present invention;

FIG. 3B is a top plan view of the said corner bracket;

FIG. 4A is a right side elevation view of a stacking bracket of the present invention;

FIG. 4B is a top plan view of the said stacking bracket;

FIG. 4C is a left side elevation view of the said stacking bracket;

FIG. 5A is a side elevation view of a splice bracket of the present invention;

FIG. 5B is a top plan view of the said splice bracket;

DESCRIPTION OF THE PREFERRED EMBODIMENT

Figure 6A:
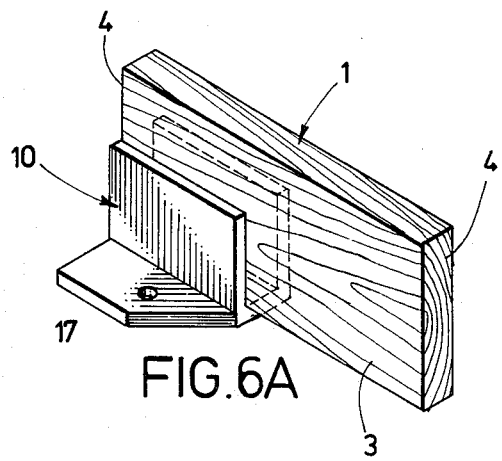
FIG. 6A is a view in perspective of an end bracket of the present invention.

Referring now to the drawings in greater detail, FIGS. 1A, 1B, 1C and 6A illustrate an end bracket 10 of the present invention comprising a flat base 11 having extending upward therefrom an upward opening channel 12 formed by a pair of opposed side members 13, 14. The channel 12 formed by the side members 13, 14 is adapted to receive removably inserted therein an end 4 of a fence board 3, and a square end 15 of the said base 11 is adapted to abut against a wall, board or other flat surface. A plurality of holes 17 is provided through the base 11 through which stakes 2 may be driven or other fasteners may be inserted to anchor the end bracket 10 to the ground or to some other support.

Figure 6B:
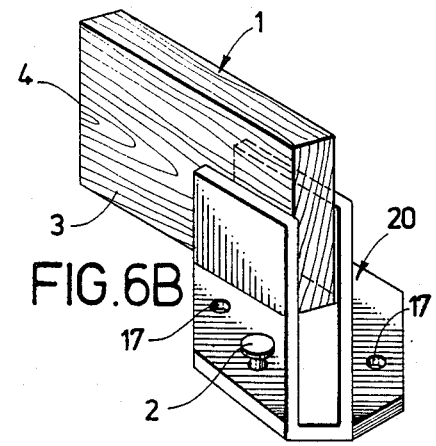
FIG. 6B is a view in perspective of an angle bracket of the present invention.

FIGS. 2A, 2B, 2C, and 6B illustrate an angle bracket 20 of the present invention comprising a flat base 21 having extending upward therefrom an upward opening channel 22 formed by a pair of opposed side members 23, 25, each of which is formed at its middle 24, 26 into an angle 29. The channel 22 formed by the side members 23, 25 is adapted to receive removably inserted therein abutting ends 4 of a pair of fence boards 3 to form an angle 29 of a fence 1. A plurality of holes 17 is provided through the base 21 through which stakes 2 may be driven or other fasteners may be inserted to anchor the angle bracket 20 to the ground or to some other support.

Figure 6C:
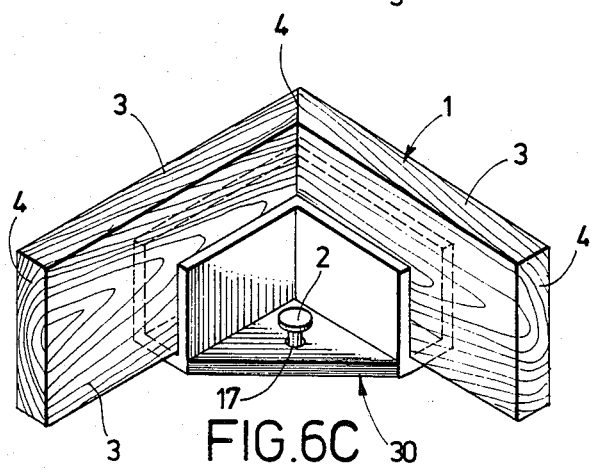
FIG. 6C is a view in perspective of a corner bracket of the present invention.
Figure 6D:
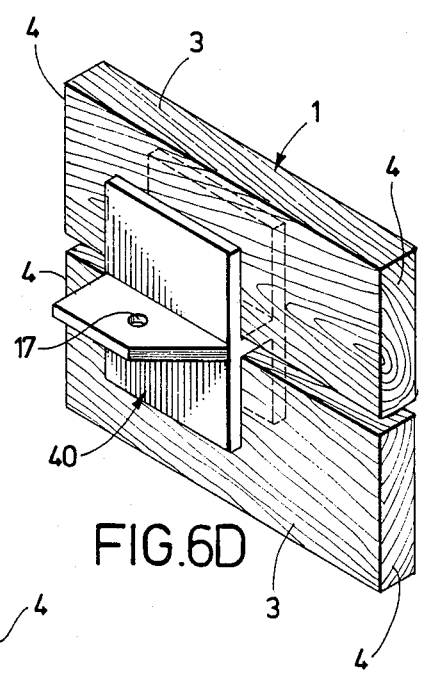
FIG. 6D is a view in perspective of a stacking bracket of the present invention.
Figure 6E:
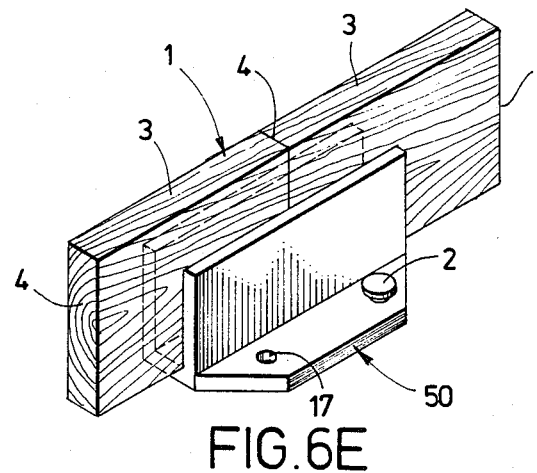
FIG. 6E is a view in perspective of a splice bracket of the present invention.

FIGS. 3A, 3B, 3C, and 6C illustrate a corner bracket of the present invention. The corner bracket 30 comprises a flat base 31 having extending upward therefrom an upward opening channel 32 formed by a pair of opposed side members 33, 35 each of which is formed at its middle 34, 36 into a right angle 39. The channel 32 formed by the side members 33, 35 is adapted to receive removably inserted therein abutting ends 4 of a pair of fence boards 3 to form a corner 39 of a fence 1. A plurality of holes 17 is provided through the base 31 through which stakes 2 may be driven or other fasteners may be inserted to anchor the corner bracket 30 to the ground or to some other support.

FIGS. 4A, 4B, and 4C illustrate a stacking bracket 40 of the present invention comprising an "H" section 41 having an upward opening channel 42 and a downward opening channel 43, the said "H" section having extending outward from the one side 44 and perpendicular thereto a flange 45 having provided therethrough a plurality of holes 17 through which stakes 2 may be driven or other fasteners may be inserted to anchor the angle bracket 40 to the ground or to some other support.

FIGS. 5A and 5B illustrate a splice bracket 50 of the present invention comprising a flat base 51 having extending upward therefrom an upward opening channel 52 formed by a pair of opposed side members 53, 54. The channel 52 formed by the side members 53, 54 is adapted to receive removably inserted therein a fence board 3 or abutting ends 4 of a pair of fence boards 3 to form an in-line splice 59 of a fence 1. A plurality of holes 17 is provided through the base 51 through which stakes 2 may be driven or other fasteners may be inserted to anchor the splice bracket 50 to the ground or to some other support.

Also provided is a plurality stakes 2 adapted to be inserted in and driven through the holes 17 in the said brackets 10, 20, 30, 40, 50 and a plurality of fence boards 3 adapted to be removably inserted into the said end bracket 10, angle bracket 20, corner bracket 30, stacking bracket 40, and splice bracket 50. The brackets 10, 20, 30, 40, 50 may be constructed of any suitable structural material such, for example, as aluminum, steel, wood, or plastic.

A boundary fence of the present invention may be constructed by placing the square end 15 of an end bracket 10 against a board 3 or wall, inserting stakes 2 through the holes 17 in the base 11 and driving the said stakes 2 into the ground, and by inserting an end 4 of a fence board 3 into the channel 12.

A boundary fence of the present invention may be constructed by placing an angle bracket 20 on the ground, inserting stakes 2 through the holes 17 in the base 21 and driving the said stakes 2 into the ground, and by inserting the ends 4 of a pair of fence boards 3 into the channel 22.

A boundary fence of the present invention may be constructed by placing a corner bracket 30 on the ground, inserting stakes 2 through the holes 17 in the base 31 and driving the said stakes 2 into the ground, and by inserting the ends 4 of a pair of fence boards 3 into the channel 32.

A boundary fence of the present invention may be constructed by placing a fence board 3 or abutting ends 4 of a pair of fence boards 3 on the ground, placing the downward opening channel 43 of a stacking bracket 40 over the said fence board 3 or abutting ends 4 of the pair of fence boards 3, inserting stakes 2 through the holes 17 in the base 41 and driving the said stakes 2 into the ground, and by inserting a fence board 3 or abutting ends 4 of a pair of fence boards 3 into the upward opening channel 42 of the said stacking bracket 40.

A boundary fence of the present invention may be constructed by placing a splice bracket 50 on the ground, inserting stakes 2 through the holes 17 in the base 51 and driving the said stakes 2 into the ground, and by inserting a fence board 3 or the ends 4 of a pair of fence boards 3 into the channel 52.

Having thus described my invention, what I now claim is:

1. A fence comprising a fence board support bracket having a base and having provided on the said base a pair of opposing guide means adapted to receive removably inserted therein a plurality of fence boards, means for anchoring said base to the ground, and a plurality of fence boards adapted to be removably inserted into the said plurality of guide means, wherein the said base comprises a flat plate having provided therethrough a plurality of holes each of which is adapted to receive a stake removably inserted therethrough, and wherein the said plurality of guide means comprises an upward opening channel and a downward opening channel, each channel being formed by a pair of opposing side members, and wherein the said anchor means comprises a plurality of stakes each of which is adapted to be removably inserted through a hole of the said plurality of holes in the said base and to be driven into the ground.

* * * * *